(No Model.)
J. C. SPINDLE.
MILLSTONE DRESS.
No. 285,081. Patented Sept. 18, 1883.
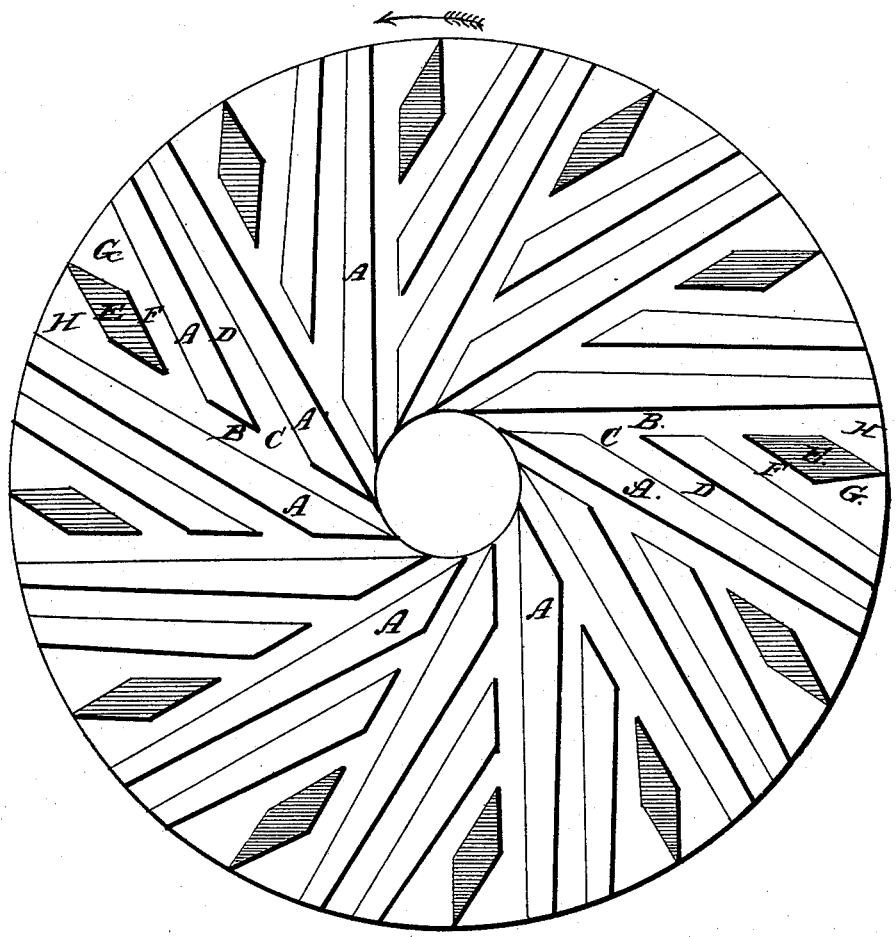
WITNESSES:
Fred. G. Dieterich.
Arthur L. Morsell.
Joseph C. Spindle,
INVENTOR.
By Louis Bagger & Co.
ATTORNEYS.

UNITED STATES PATENT OFFICE.

JOSEPH C. SPINDLE, OF LORETTO, VIRGINIA.

MILLSTONE-DRESS.

SPECIFICATION forming part of Letters Patent No. 285,081, dated September 18, 1883.

Application filed July 10, 1883. (No model.)

*To all whom it may concern:*

Be it known that I, JOSEPH C. SPINDLE, a citizen of the United States, of Loretto, in the county of Essex and State of Virginia, have invented a certain new and useful Improvement in Millstone-Dress; and I do hereby declare that the following is a full, clear, and exact description of the invention, which will enable others skilled in the art to which it appertains to make and use the same, reference being had to the accompanying drawing, which forms a part of this specification.

The object of my improved millstone-dress is, in common with others, to secure the proper proportion or quantity of material on the stone from the eye to the skirt; but my object is, further, to provide for the perfect grinding of the middlings before the skirt is reached; and to this end my improvement consists in the peculiar quarter-dress herein shown and described, in which I increase the width of the "leaders" and "skirt-furrows" at the skirt, and thereby provide a raised lozenge-shaped platform or "land" section between the leader and the skirt-furrow of each quarter, substantially as hereinafter more fully described and claimed, reference being had to the accompanying drawing, in which I have shown a face view of my improved millstone-dress.

In the drawing, A denotes the lands of a millstone or burr, which may be of any desired material adapted for the purpose. B are the leaders or main furrows, which extend from the eye to the skirt; and D are the "second furrows" or branch furrows, which intersect the leaders at an acute angle, as shown at C. At the point where the leader reaches the skirt it is enlarged by cutting away the land contiguous to it, to form one side of the diamond-shaped or lozenge-shaped platform E, which is bounded on the other side by the enlarged part G of the skirt-furrow F. In other words, I so cut away the land of the stone at the points G and H as to leave a diamond-shaped platform, E, between the enlargements G and H, which constitute the outer termini of furrows F and B, respectively, there being one of these lozenge-shaped platforms for each quarter of furrows. Thus it will be seen that the leaders, second furrows, and skirt-furrows do not continue of equal width from their respective inner starting-points to the skirt, but are enlarged or widened at the skirt or periphery of the stone, whereas in the ordinary dress of this description the furrows continue of equal width from the eye to the skirt.

The advantages of this peculiar dress are that, as the middlings gradually work their way from the eye of the stone to the skirt, they will be ground finer and finer until they at last reach that part of the stone where the leaders B are intersected by the skirt-furrows F; and at this point they are met by the inner pointed ends of the platforms E, where they are subjected to a further degree of comminution between the platforms of the runner and bed stone, this being the final step in the process of grinding; and after this is accomplished the enlargements G and H, at the outer ends of the skirt-furrows and leaders, respectively, will permit of the ready discharge of the flour without choking up the furrows.

Having thus described my invention, I claim and desire to secure by Letters Patent of the United States—

The improved millstone-dress herein shown and described, consisting of the straight leaders B, the skirt-furrows F, and the lozenge-shaped platforms or land-sections E, said furrows B and F being cut away where they intersect the skirt of the stone to form enlargements H and G on opposite sides of and forming boundaries for the platforms, substantially as shown, and for the purpose set forth.

In testimony that I claim the foregoing as my own I have hereunto affixed my signature in presence of two witnesses.

JOSEPH C. SPINDLE.

Witnesses:
C. L. GARNETT,
WM. C. CARTER.